United States Patent
Jasem

(10) Patent No.: US 7,469,767 B2
(45) Date of Patent: Dec. 30, 2008

(54) SPEED CONTROL METHOD AND SYSTEM FOR A MOTOR VEHICLE

(76) Inventor: Jasem Al Jasem, P.O. Box 200, Salmiya 22002 (KW)

( * ) Notice: Subject to any disclaimer, the term of this patent is extended or adjusted under 35 U.S.C. 154(b) by 395 days.

(21) Appl. No.: 11/195,730

(22) Filed: Aug. 3, 2005

(65) Prior Publication Data
US 2007/0028888 A1 Feb. 8, 2007

(51) Int. Cl.
*B60R 25/04* (2006.01)
*B60K 31/00* (2006.01)
*B60K 31/18* (2006.01)

(52) U.S. Cl. .............. 180/287; 180/170; 180/268; 180/286; 340/441; 340/466

(58) Field of Classification Search ........... 180/170, 180/171, 268, 281, 286, 287; 340/441, 466, 340/471; 701/110, 93
See application file for complete search history.

(56) References Cited

U.S. PATENT DOCUMENTS

| | | | |
|---|---|---|---|
| 3,633,158 A | | 1/1972 | Heibel |
| 3,656,099 A | | 4/1972 | Campbell |
| 3,686,628 A | | 8/1972 | Kleller et al. |
| 3,774,025 A | | 11/1973 | Auer, Jr. et al. |
| 3,878,915 A | * | 4/1975 | Purland et al. ............... 180/170 |
| 3,941,204 A | * | 3/1976 | Kurii et al. .................. 180/286 |
| 4,068,734 A | * | 1/1978 | Foeller ........................ 180/169 |
| 4,136,331 A | | 1/1979 | Cullen |
| 5,739,749 A | * | 4/1998 | Hwang .................. 340/426.11 |
| 5,805,057 A | * | 9/1998 | Eslaminovin .......... 340/426.12 |
| 6,037,861 A | * | 3/2000 | Ying .......................... 340/441 |
| 6,072,391 A | * | 6/2000 | Suzuki et al. ............... 340/468 |
| 6,260,650 B1 | * | 7/2001 | Gustavsson ................. 180/270 |
| 6,356,833 B2 | * | 3/2002 | Jeon ............................ 701/93 |
| 6,526,352 B1 | * | 2/2003 | Breed et al. ................. 701/213 |
| 6,629,515 B1 | | 10/2003 | Yamamoto et al. |
| 6,647,328 B2 | | 11/2003 | Walker |
| 6,666,411 B1 | | 12/2003 | Hart et al. |
| 6,693,555 B1 | * | 2/2004 | Colmenarez et al. ........ 340/905 |
| 6,700,504 B1 | | 3/2004 | Aslandogan et al. |
| 6,758,298 B2 | | 7/2004 | Eberling et al. |
| 6,888,495 B2 | * | 5/2005 | Flick ..................... 342/357.07 |
| 7,023,333 B2 | * | 4/2006 | Blanco et al. ............... 340/441 |

* cited by examiner

*Primary Examiner*—John Q. Nguyen
*Assistant Examiner*—George D. Spisich
(74) *Attorney, Agent, or Firm*—Lowe Hauptman Ham & Berner, LLP

(57) ABSTRACT

A method for regulating the speed of a motor vehicle includes the steps of sensing an open door, verifying the authorization of a driver, and preventing the flow of fuel to the engine until an authorized driver has securely closed the vehicle doors. The method also includes the steps of sensing that the driver's seat belt is securely fastened and limiting the flow of fuel to thereby provide a relatively slow speed until the seat belt is fastened and thereafter limiting the flow of fuel to provide a second pre-selected speed. Further, the method includes the steps of overriding the second pre-selected speed and activating a vehicle's flashers when the second pre-selected speed is exceeded. Apparatus for accomplishing the method is also disclosed.

1 Claim, 3 Drawing Sheets

SPEED CONTROL METHOD AND SYSTEM FOR A MOTOR VEHICLE

FIELD OF THE INVENTION

This invention relates to a speed control system for a motor vehicle and more particularly to a speed control system for an automobile that automatically reduces or limits the speed of the auto and warns the driver and others when a pre-selected speed, as for example a speed limit, is being exceeded.

BACKGROUND FOR THE INVENTION

Vehicle speed regulators and control systems are well known and have been in the public domain for many years. For example, a U.S. Pat. No. 3,686,628 of Keller et al. discloses a vehicle speed regulator and control system utilizing radio signals from highway transmitters. The signals provide an indication to the vehicle driver of the speed limit along that portion of the highway and provides other psychological controls and indications relating to vehicle speed.

A more recent U.S. Pat. No. 6,470,260 of Martens et al., discloses a method and apparatus for remotely controlling motor vehicles. As disclosed therein, the system for remotely controlling a targeted vehicle comprises a control unit, which would normally be located in a police car, and vehicle modules, which are installed in motor vehicles. The control unit transmits activate commands to the vehicle modules which respond by either transmitting back a visual or electronic signal. The control unit may also transmit control commands to control the operation of the target vehicle. For example, a "flash" command initiates a visual indicator such as a vehicle's four-way flasher. The control command may also slow a vehicle or cause it to stop and a reset for resetting the vehicle module.

Another U.S. Pat. No. 6,647,328 of Walker, discloses electronically controlled automated devices to control equipment and machinery with remote control. As disclosed by Walker, the devices reduce a vehicle speed and/or stop any piece of equipment. In addition, the devices secure a piece of equipment in a safe stationary position.

Notwithstanding the above, it is presently believed that there may be a large commercial market for a speed control system in accordance with the present invention. There should be a market for such systems, which can reduce automobile accidents and in many cases reduce the severity of such accidents. In addition, the system in accordance with the present invention may reduce gas consumption and wear and tear on an automobile.

Another important advantage of the present invention resides in its use to help young and sometimes reckless drivers mature into a responsible adult. Another important advantage resides in facilitating the enforcement of traffic laws by the police and in warning drivers of other cars to avoid a vehicle that is approaching at an excessive speed.

In addition to the above, it is presently believed that the system in accordance with the present invention can be manufactured in relatively small or compact sizes, will readily fit into new cars or be retrofitted into older vehicles, and can be manufactured at a reasonably low price. Further, it is believed that such devices can be readily installed in a vehicle, are durable, minimize or reduce the need for repairs and will ease the fear of parents in permitting their children to operate a vehicle.

Further, the system in accordance with the present invention are relatively simple in design and operate with and incorporate many conventional parts such as those disclosed in the prior art. Accordingly, the previously mentioned patents, U.S. Pat. Nos. 3,686,628, 6,476,260 and 6,647,328 are incorporated herein in their entirety by reference.

BRIEF SUMMARY OF THE INVENTION

In essence, a speed control system for a motor vehicle as for example an automobile automatically reduces, limits the speed of an auto and warns the driver and other drivers when the auto is being driven at an excessive rate of speed for conditions and locations. An automobile equipped with this system includes an engine, a door for entering and leaving the motor vehicle, a seat belt for fastening a driver to a seat in the vehicle and one or more exterior warning lights. The vehicle also includes a source of fuel such as gasoline and a control means for controlling the flow of fuel to the engine. The control means for controlling the flow of fuel to the engine may include the fuel pump and/or throttle mechanism or electric means tied to a tachometer or speedometer.

The system also includes means for sensing the secure closing of one or more doors on an automobile. Such means may be a conventional design as used to indicate an open door or a trunk in many of today's vehicles. However, in the present invention the control means prevents the flow of fuel to the engine when a door is partially or fully opened. An additional safety feature resides in means for sensing the fastening of the seat belt and means including the fuel control means for limiting the flow of fuel to the engine. In this case, the limited flow of fuel to the engine restricts the speed of the motor vehicle to a first relatively slow speed when the seat belt is not fastened.

In a preferred embodiment of the invention, the system includes control means for limiting the flow of fuel to the engine to a second level. In this way the speed is restricted to a second pre-selected speed when the seat belt is fastened as for example restricting the speed to approximately 55, 60 or 65 miles per hour.

Further, the preferred embodiment of the invention includes means for increasing the flow of fuel to the engine in excess of the second level. In other words, means are provided for increasing the speed of the vehicle for passing other vehicles or under conditions when a higher rate of speed that is above a posted limit is appropriate. However, the system also includes activating means for flashing one or more warning lights on and off when the speed of the motor vehicle exceeds the second pre-selected speed.

In a further modified form of the invention, the system includes means for limiting the speed of the motor vehicle to a third pre-selected speed when the vehicle enters an area with a low speed limit such as an area near or adjacent a school. Such means is automatically activated when the auto enters the area.

The invention will now be described in connection with the accompanying figures.

DESCRIPTION OF THE PREFERRED EMBODIMENTS OF THE INVENTION

Figure 1:
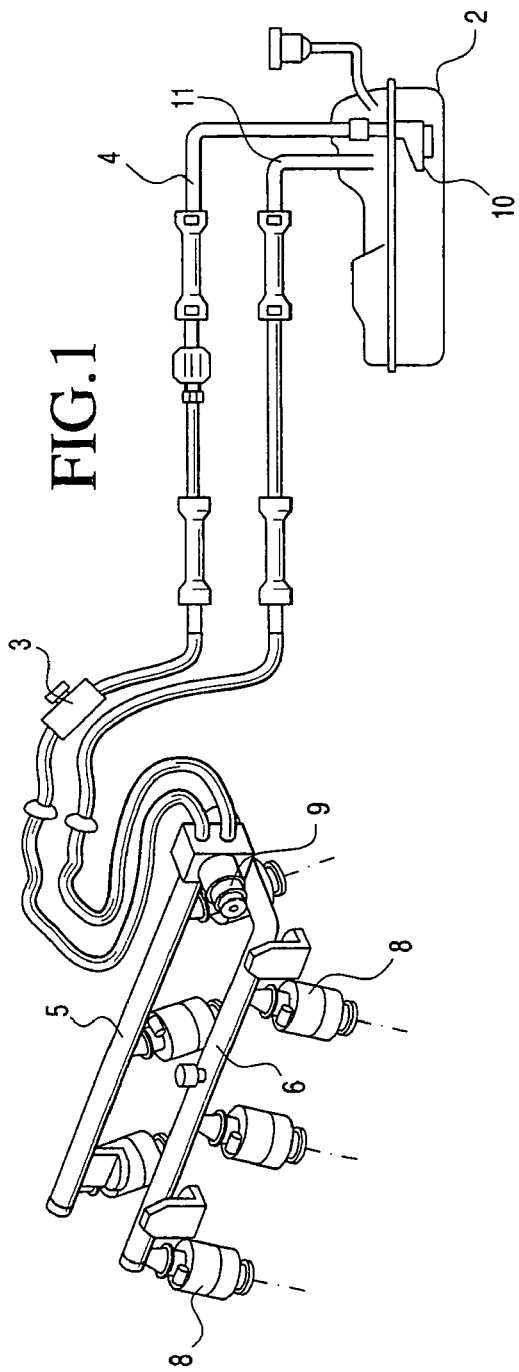
FIG. 1 is a schematic illustration of a prior art fuel system of a type which may be incorporated in the present invention.

FIG. 1 illustrates a prior art fuel control system of a type disclosed in the U.S. Pat. No. 6,647,328 of Walker, which is incorporated herein in its entirety by reference. As shown in FIG. 1, a gasoline tank 2 of the type used in motor vehicles mainly automobiles, trucks and the like is connected to a fuel line 4 for delivering fuel to an internal combustion engine (not shown). A fuel pump 10 such as an electric fuel pump, pumps the fuel through the fuel line 4 and through a fuel control valve 3 which regulates the flow of fuel to a pair of fuel rails 5 and 6 for delivery to injectors 8 by means of a fuel regulator 9 all of which are conventional in design. The system also includes a fuel regulator which maintains adequate fuel pressure in the system and is connected to a return line 11 and by means of an electric solenoid or motor or pressure actuated means can be a variable valve so that when it is activated or deactivated can dump or increase the fuel rail pressure to slow the vehicle.

Figure 2:
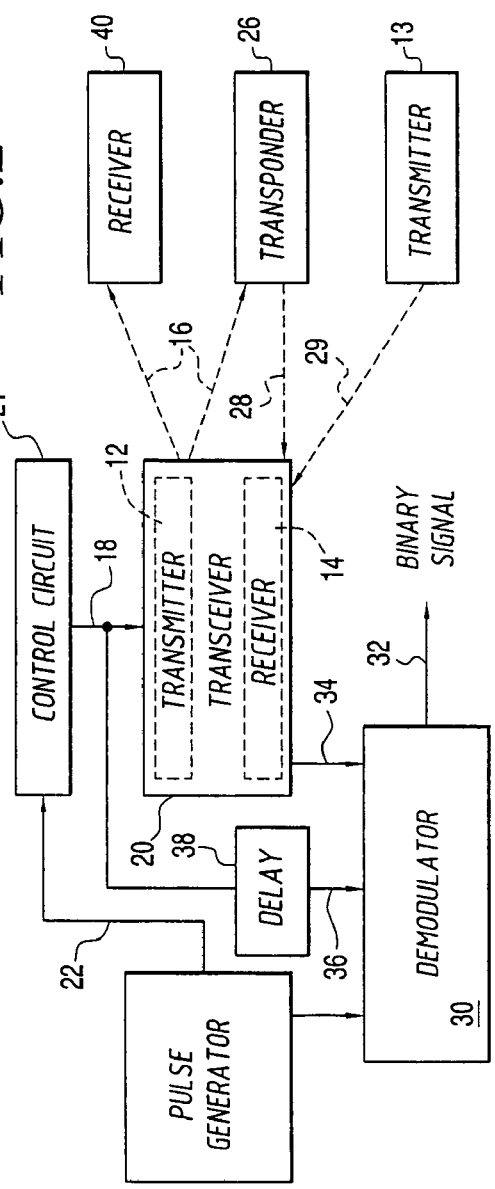
FIG. 2 is a block diagram of a prior art communication system of a type which may be incorporated in the present invention.

The speed control system also includes a conventional communication subsystem as illustrated in FIG. 2. As shown therein, a transceiver 20 includes a transmitter 12 and a receiver 14 which are positioned proximate to each other in a conventional manner. A radiant energy beam 16 is transmitted from the transmitter 12. This beam 16 is selectively encoded to convey information in response to an encoded pulsed signal 18 from a control circuit 21 in which circuit 21 a pulsed signal 22 from a pulse generator 24 is encoded. The transmitted beam 16 is scanned across a passive coded transponder 26 to provide a modulated information-conveyor beam 28, which is reflected to the receiver 14. The modulated beam 28 is demodulated by a demodulator 30, which provides a binary signal 32 in response to a comparison of a received signal, which is produced in response to the modulated beam and a pulsed clocking signal 36, which is provided in response to the encoded pulsed signal 18 is therefore a representation of the transmitted beam 16.

Depending on the distance between the transceiver 20 and the transponder 26 the encoded pulsed signal 18 to which the pulsed clocking signal 36 is responsive may be slightly delayed by delay circuit 38 for approximately the time it takes for the transmitted beam 16 to reach transponder 26 and for the modulated beam 28 to reach receiver 14. However, when the transceiver is closely positioned a delay is unnecessary. Further details of the above system are more fully described in the U.S. patent of Heibel, No. 3,633,158, which is incorporated herein in its entirety by reference. However, it should be recognized that other conventional communication systems as will be well understood by those of ordinary skill in the art may be used in place of the one described.

The speed control system in accordance with the presently preferred embodiment of the invention will now be described in connection with FIG. 3.

Figure 3:
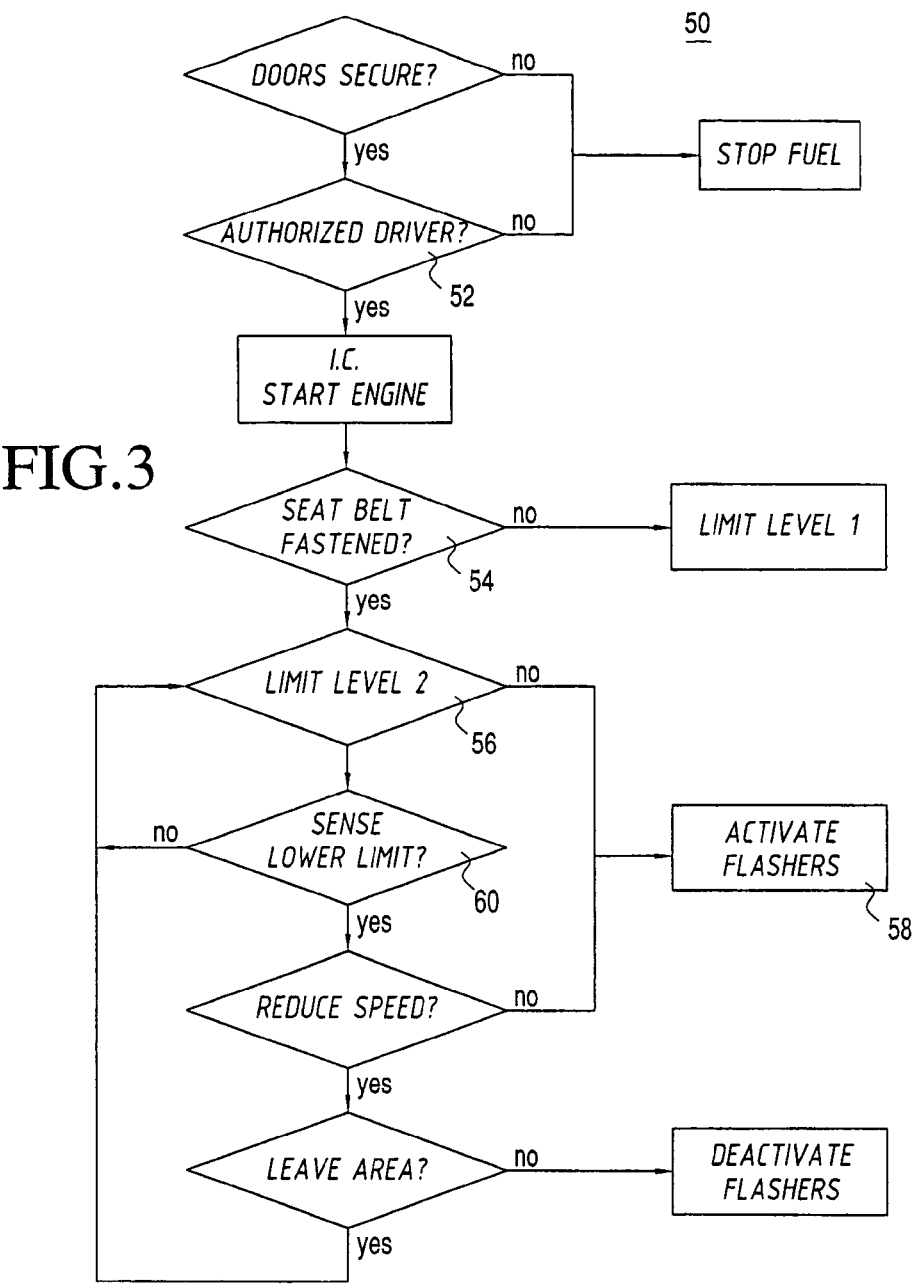
FIG. 3 is a schematic diagram of a speed control system and method in accordance with a preferred embodiment of the invention.

As shown in FIG. 3, a speed control system for an automobile automatically reduces and/or limits the speed of the vehicle and warns the driver of a vehicle and others that the vehicle is being operated at an excessive rate of speed.

In its simplest form, the system includes a number of conventional elements. For example, a sensor determines whether all of the doors in the auto are securely closed in a first step and if not stops the flow of fuel such as gasoline from being delivered to an internal combustion engine. It is true, that a number of conventional autos include features such as a buzzer, light or indicator on the dashboard to warn drivers of such problems. However, such systems do not stop or limit the flow of fuel to the engine under such circumstances.

The speed control system and method for controlling the speed of a motor vehicle also includes a door open/closed sensor for generating a signal indicative of an open door in a first step 50. This subsystem is essentially conventional and performs the same function as used in many of today's cars to indicate a passenger or driver has not securely closed the door. However, if in the present invention, one or more doors are not securely closed the signal is sent to the fuel control valve, which is closed to protect the automobile from starting. While it is stated that the signal is sent to the fuel control valve it could be sent to the fuel pump, such as an electric fuel pump to disable the fuel pump. Then if all doors are securely closed the system allows free flow of fuel for starting the engine. The system may also include means for sensing driver authorization such as a keypad or a pin number or other conventional system for screening an individual for authorization in a second step 52. Again, if the person attempting to use the vehicle is not an authorized driver a signal is sent to a fuel control valve or fuel pump or other mechanism to prevent the flow of fuel to the engine.

If the steps 50 and 52 are successfully completed, the engine is started and the system then tests whether or not the driver's and others' seatbelts are fastened in step 54. Once again, a conventional system is used and may include sensors on each seat to determine if someone is sitting in the seat without the seatbelt fastened. If the driver's seat and/or others seats are not fastened, the fuel control valve limits the amount of fuel delivered to the engine, so that, the vehicle is limited in speed to perhaps 15, 25 or 30 miles per hour. This provision allows a person to move a car in a parking lot to a parcel pick-up area in a supermarket or the like or from a parking spot to an auto service area without using a seatbelt.

In step 56, when a seatbelt is fastened the speed control system limits the flow of fuel to the engine to a first selected speed as for example, 50, 60 or 70 miles per hour. The preselected speed can be within the maximum speed limit for a given area to perhaps 5 or 10 miles per hour above the selected speed limit. This allows a parent to limit youthful drivers and themselves to reasonably safe speeds and can be accomplished by modification of a conventional cruise control as used on many, if not most of today's cars. Then if the control speed is exceeded, as for example pushing hard on the accelerator or pedal for passing or merely overriding the control, the vehicle's flashers will be activated in step 58 and indicate to the police and other drivers that the vehicle is being operated at an excessive rate of speed.

In the preferred embodiment of the invention, the speed control system also includes means such as the previously discussed communication subsystem for detecting an area of reduced speed in step 60 such as a reduced speed zone or school zone and to activate the vehicle's flashers if that speed is being exceeded.

The communication system may also be used to sense when a vehicle leaves a reduced speed zone in step 62 and reverts to step 56, which allows the vehicle to proceed without flashers as long as the vehicle is operated below the second pre-selected level of speed.

Figure 4:
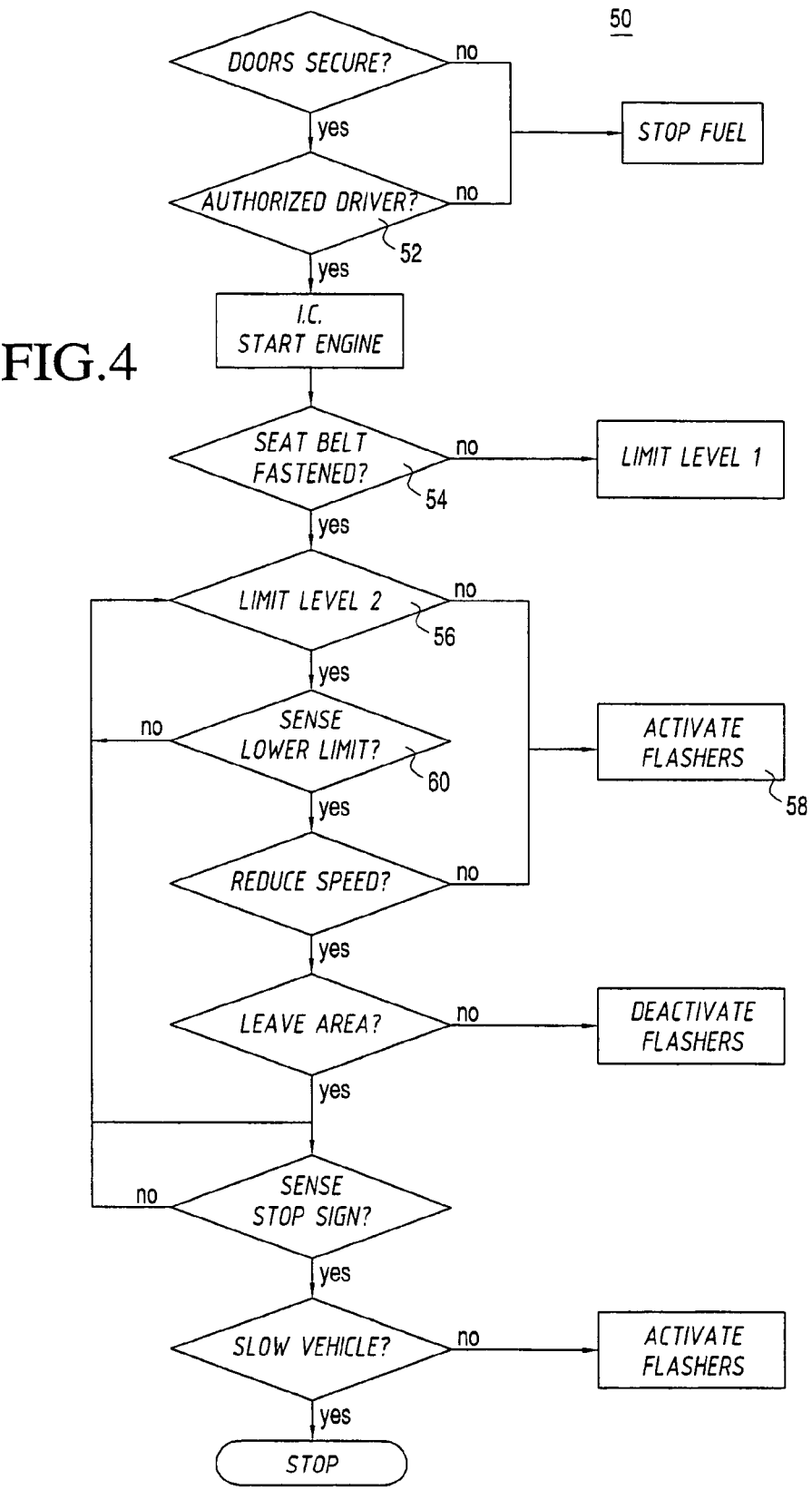
FIG. 4 is a schematic illustration of a subsystem for use in the preferred embodiment of the invention.

FIG. 4 illustrates a further embodiment of the invention wherein a 12-volt circuit activates a horn and/or flasher 70 when the vehicle is being operated in an excessive rate of speed. In this embodiment of the invention, the flashers may be activated at a first pre-selected speed as for example 60 miles per hour and then at a second pre-selected speed as for example 70 miles per hour is exceeded the horn may be pulsed as an added warning.

Figure 5:
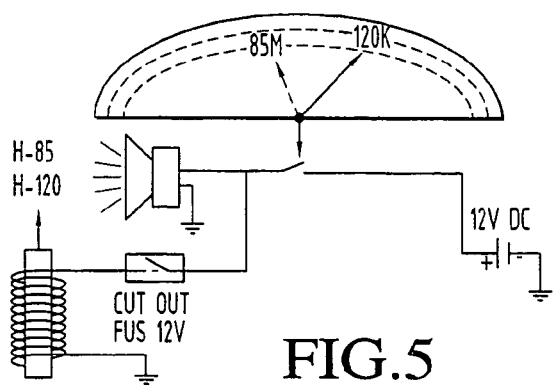
FIG. 5 is a schematic diagram of a speed control system in accordance with a further embodiment of the invention.

A further embodiment of the invention is illustrated in FIG. 5 wherein the system by means of video camera or radio signal senses the approach of a stop sign and slows the vehicle to a controlled stop by limiting the flow of gasoline to a relatively slow speed. Then after detecting a complete stop the system will revert to the normal speed.

While the invention has been described in connection with its preferred embodiments, changes and modifications may be made therein without departing from the scope of the appended claims.

What is claimed is:

1. A speed control system for a motor vehicle comprising:

an internal combustion engine, doors for entering and leaving the motor vehicle, seat belts for fastening a driver and passengers to a seat in the motor vehicle and an exterior warning light having means for flashing said warning light on and off;

a source of liquid hydrocarbon fuel and control means including a fluid control valve for controlling the flow of fuel to said engine;

means for sensing driver authorization and for screening an authorization to operate the vehicle and means including said fluid control valve to stop the flow of fluid to the engine if an individual is not authorized to operate the vehicle;

means for sensing the secure fastening of said doors and means including said fluid control valve for preventing the flow of fuel to said engine in the absence of the secure fastening of each of said doors;

means for sensing occupied seats and the fastening of said driver's and said passenger's seat belts and means including said fluid control valve for limiting the flow of fuel to said engine to a first level to thereby restrict the speed of said motor vehicle to a first relatively slow speed when one of said seat belts is not fastened;

means including said fluid control valve for limiting the flow of fuel to said engine to a second level to thereby restrict the speed to a second pre-selected speed when said seat belts are fastened;

means for increasing the flow of fuel to said engine in excess of said second level to thereby increase the speed of said motor vehicle in excess of said second pre-selected speed;

means for activating said means for flashing said warning light on and off when the speed of the motor vehicle exceeds the second pre-selected speed;

remote means for preventing the flow of fuel to said engine in the event of an unauthorized user of said motor vehicle;

a communication receiver for receiving information on a speed limit in a specific area and means responsive to said information to limit the flow of fuel to said engine to thereby provide a third pre-selected level and thereby limit the speed of said motor vehicle to a pre-selected speed for said specific area;

means for sensing when a vehicle leaves a reduce speed zone and allowing the vehicle to proceed without flasher as long the vehicle is operated below the second pre-selected level of speed; and means including a video camera for detecting a stop sign and for automatically reducing the speed of said motor vehicle as it approaches a stop sign.

* * * * *